(12) United States Patent
Koch

(10) Patent No.: US 12,091,074 B2
(45) Date of Patent: Sep. 17, 2024

(54) SYSTEM FOR TRANSPORTING, TRANSFERRING, AND/OR STORING GOODS

(71) Applicant: Hilko Koch, Krefeld (DE)

(72) Inventor: Hilko Koch, Krefeld (DE)

(*) Notice: Subject to any disclaimer, the term of this patent is extended or adjusted under 35 U.S.C. 154(b) by 440 days.

(21) Appl. No.: 17/415,453

(22) PCT Filed: Nov. 14, 2019

(86) PCT No.: PCT/EP2019/081409
§ 371 (c)(1),
(2) Date: Jun. 17, 2021

(87) PCT Pub. No.: WO2020/126246
PCT Pub. Date: Jun. 25, 2020

(65) Prior Publication Data
US 2022/0055675 A1 Feb. 24, 2022

(30) Foreign Application Priority Data

Dec. 19, 2018 (EP) .................................... 18213828

(51) Int. Cl.
*B62B 3/16* (2006.01)
*B62B 3/14* (2006.01)
*B62B 5/00* (2006.01)

(52) U.S. Cl.
CPC .............. *B62B 3/16* (2013.01); *B62B 3/1476* (2013.01); *B62B 5/0093* (2013.01);
(Continued)

(58) Field of Classification Search
CPC ...... B62B 3/16; B62B 3/1476; B62B 2203/44; B60P 7/0807; B60P 7/0815; B60P 7/15;
(Continued)

(56) References Cited

U.S. PATENT DOCUMENTS

| | | | | |
|---|---|---|---|---|
| 738,710 | A | * | 9/1903 | Whitlock .................. B62B 1/14 |
| | | | | 410/51 |
| 1,085,237 | A | * | 1/1914 | Bell .......................... B62B 1/14 |
| | | | | 5/119 |

(Continued)

FOREIGN PATENT DOCUMENTS

| | | |
|---|---|---|
| AU | 1584788 | 11/1988 |
| DE | 2116537 | 10/1971 |

(Continued)

*Primary Examiner* — Christopher Garft
(74) *Attorney, Agent, or Firm* — Sand, Sebolt & Wernow Co., LPA

(57) ABSTRACT

A system for transporting, transferring, or storing goods including stackable receiving containers, wherein stacking structures in a region of the container bases and mating structures in an upper edge region of a side wall interact to lockably stack receiving containers one on top of the other. At least one roll transport unit has a set-up surface for a receiving container and roller transport unit which connect to longitudinal ends of an adjustable length locking bar. A retaining structure is provided on a first longitudinal end of the locking bar for connecting to the upper edge of the receiving container. A retaining structure is provided on the second longitudinal end of the locking bar for connecting to a mating structure on the roller transport unit. The locking bar has a releasable fixing mechanism for limiting the locking bar length and setting the length to a selected dimension.

17 Claims, 4 Drawing Sheets

(52) U.S. Cl.
CPC ....... *B62B 2202/12* (2013.01); *B62B 2203/44* (2013.01); *B62B 2207/02* (2013.01)

(58) Field of Classification Search
CPC ......... B60P 7/0823; B60P 7/0844; B60P 7/13; B60P 2202/12; E05B 65/0888
USPC .......................... 248/499–509; 206/503–513
See application file for complete search history.

(56) References Cited

U.S. PATENT DOCUMENTS

| | | | |
|---|---|---|---|
| 3,245,239 A | 4/1966 | Zaidener | |
| 3,920,259 A * | 11/1975 | Graham | B62B 3/008 |
| | | | 280/79.3 |
| 4,109,926 A * | 8/1978 | Lane | B62B 3/002 |
| | | | 280/43.24 |
| 4,502,619 A * | 3/1985 | Cox | B60P 7/15 |
| | | | 410/127 |
| 4,650,383 A * | 3/1987 | Hoff | B60P 7/15 |
| | | | 410/152 |
| 4,772,165 A * | 9/1988 | Bartkus | B60P 7/15 |
| | | | 410/139 |
| 5,391,040 A * | 2/1995 | Karlsen | B65G 65/24 |
| | | | 414/469 |
| 5,645,332 A * | 7/1997 | Snoke | F16B 12/38 |
| | | | 312/265.5 |
| 5,713,539 A | 2/1998 | Russ | |
| 5,862,931 A * | 1/1999 | Cox | B65D 11/1893 |
| | | | 206/508 |
| 6,135,686 A * | 10/2000 | Chasen | B60P 7/08 |
| | | | 410/38 |
| 6,524,042 B2 * | 2/2003 | Chasen | B60P 7/08 |
| | | | 410/38 |
| 7,134,673 B2 * | 11/2006 | Ferraro | A47B 87/0253 |
| | | | 280/33.993 |
| 9,120,415 B1 * | 9/2015 | Harris | B60P 7/15 |
| 9,919,642 B2 * | 3/2018 | Llewellyn | B60P 7/0892 |
| 10,550,609 B2 * | 2/2020 | Llewellyn | B63B 25/28 |
| 2003/0213878 A1 * | 11/2003 | Stahl | B62B 3/16 |
| | | | 248/129 |
| 2005/0006861 A1 * | 1/2005 | Dubois | B62B 3/16 |
| | | | 280/33.998 |
| 2016/0137215 A1 | 5/2016 | Ondrasik | |
| 2018/0245964 A1 * | 8/2018 | Gillett | G01F 19/00 |

FOREIGN PATENT DOCUMENTS

| | | |
|---|---|---|
| DE | 202010012452 | 11/2010 |
| EP | 1495937 | 1/2005 |
| WO | 2013002642 | 1/2013 |

* cited by examiner

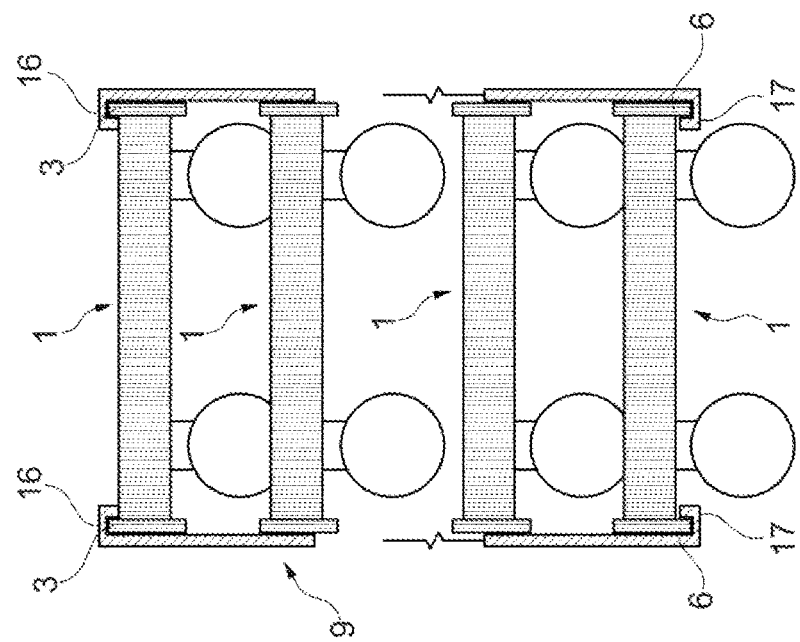
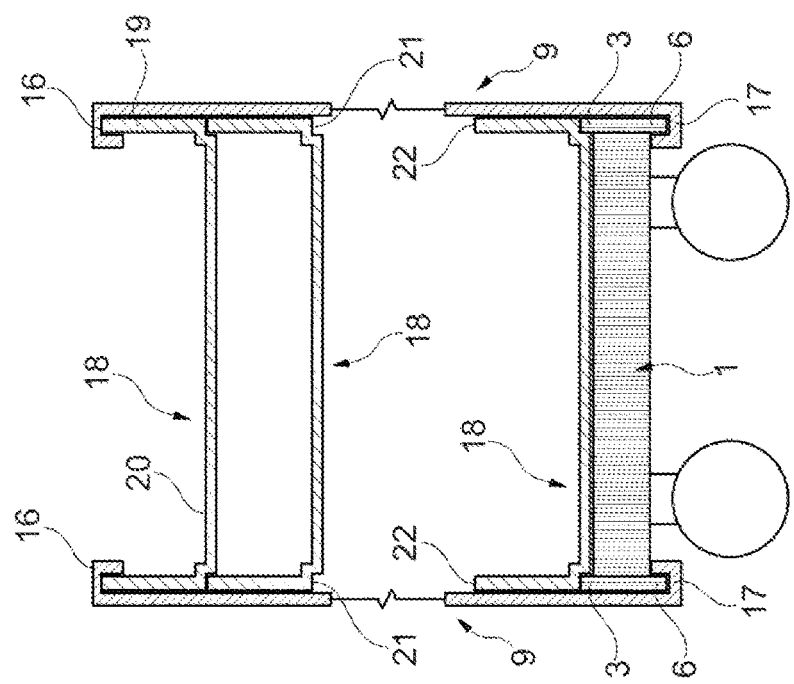

SYSTEM FOR TRANSPORTING, TRANSFERRING, AND/OR STORING GOODS

TECHNICAL FIELD

The invention is generally in the field of logistics and relates particularly to a system for transporting, transferring, and/or storing goods, particularly general cargo goods, in the wholesale and retail trade, having the features of stackable receiving containers, each having a base, a peripheral side wall, and an upper opening for receiving goods during transport and/or during storage, wherein the receiving containers each comprise stacking structures in the region of their base, which, interacting with mating structures formed in a region of an upper edge of the side wall facing the upper opening, enable receiving containers to be stacked one on top of the other in a positively locking manner within a plane of the base, at least one roller transport unit having a set-up surface for at least one receiving container and, on a bottom side opposite the set-up surface, roller means, wherein the set-up surface comprises receiving structures corresponding to the stacking structures for setting up a receiving container in a positively locking manner within a plane of the set-up surface.

BACKGROUND

Background Information

In the field of logistics, it is generally known to place goods, particularly general cargo goods, in receiving containers, for example in transport and storage cartons or also in crates, and then to transport these receiving containers in turn to a sales location, such as a retail store, in a form assembled into compact packaging units and to store them there. This transport is often carried out using motor vehicles, for example classic box vans or trucks with an enclosed loading area and a typical gross vehicle weight of 7.5 t to 40 t. The transfer of such container units, i.e. loading and unloading of means of transport or change of a means of transport, is also known.

In order to compactly assemble the receptacles into larger packing units, they are often stacked on top of one another and in many cases the containers are particularly designed to be stackable, and accordingly have stacking structures on a lower side and on an upper side of the respective container, such that they can engage positively with one another within an installation plane of the stack. For easy movement of such stacks, trolleys or comparable movable bases, such as so-called hutches, are further used in logistics, on which the stacks of transport containers are placed. Trolleys on wheels are used particularly often. A trolley is a type of rolling board which has wheels or rollers arranged on a lower side and a support surface on an upper side for placing a lowermost transport container of a stack of transport containers. The support surface is usually rectangular and its supporting dimensions are matched to fractions of the edge dimensions of other components of the logistics system, particularly the so-called Euro pallet. This is because the receptacles used in logistics here are not only stacked on such trolleys, but also, for example, on Euro pallets in the higher-level logistics chain, on which they are to be placed to fill as much area as possible in order to achieve the highest possible utilization of space in the logistics chain and thus minimize transport costs particularly, but also storage and handling costs. The trolleys typically have a plurality of side retaining grids, typically defined at the longer side edges of the support surface, extending from the support surface to a height typically equal to the maximum stack height of a stack of receiving containers disposed on the support surface of the trolley. However, the height of the container stacks can also exceed the height of the retaining grids. The retaining grids are intended to prevent the stack of receiving containers from tipping over sideways on such trolleys. In the case of a trolley loaded with a receiving container stack, tipping of the receiving stack in the direction of the remaining sides not closed with a retaining grid is prevented by locking elements, such as elastic tension belts, chains, or ropes, which are guided between the retaining grids.

The problem with this logistics unit consisting of trolleys and receiving containers is that when loaded trolleys are placed next to each other, their laterally arranged retaining grids collide on the long sides and thus prevent such container units from being arranged compactly side by side. This means, for example, that the trolleys cannot be placed next to each other in a compact, space-saving manner on the enclosed loading areas of a typical truck, the footprint of which areas is also substantially based on the dimensions of Euro pallets, but instead packing density or space utilization of the loading area is low. Accordingly, such delivery vehicles can be loaded with at a respectively lower capacity, resulting in increased costs and expenses in the logistics chain. This is an additional significant disadvantage, especially in areas where the logistics chain has to enter the inner city areas, which are often only open to traffic by large vehicles at specific times, in order to supply the retail outlets located there. Another disadvantage of this known solution is that the trolleys continue to require the same amount of space even after the goods arranged on them in receiving containers have been unloaded, such that there is also an equal need for loading space capacity for empty transports of the trolleys alone.

Due to analogous considerations, the known system is also problematic with respect to the storage of the goods combined in the container units. This is because, again, the trolleys filled with the receiving containers take up a significant amount of floor space, thus requiring costly storage space, for example, on site at a retail store, such as a grocery store or supermarket. Here again, it is particularly disadvantageous that trolleys which have been unloaded and are to be temporarily stored before return transport require the same amount of space in the warehouse as trolleys filled with goods arranged in stacked receiving containers.

SUMMARY

The present invention addresses these recognized problems and seeks to provide a remedy. In other words, the underlying problem of the invention is that of specifying a system for transporting, transferring, and/or storing goods, particularly general cargo goods in the wholesale and retail trade, which avoids the disadvantages described above and, particularly, enables improved utilization of the loading and storage space in transport and storage.

This problem is solved according to the invention by a system for transporting, transferring, and/or storing goods, particularly general cargo goods in the wholesale and retail trade, having the features of stackable receiving containers, each having a base, a peripheral side wall, and an upper opening for receiving goods during transport and/or during storage, wherein the receiving containers each comprise stacking structures in the region of their base, which, interacting with mating structures formed in a region of an upper edge of the side wall facing the upper opening, enable receiving containers to be stacked one on top of the other in a positively locking manner within a plane of the base, at least one roller transport unit having a set-up surface for at least one receiving container and, on a bottom side opposite the set-up surface, roller means, wherein the set-up surface comprises receiving structures corresponding to the stacking structures for setting up a receiving container in a positively locking manner within a plane of the set-up surface, characterized by at least one locking bar comprising two longitudinal ends and adjustable in length, at least in its length connecting the longitudinal ends, particularly telescopically, wherein a retaining structure is provided for connection to an upper edge of a receiving container at a first of the longitudinal ends of the locking bar and wherein a retaining structure is provided for connection to a mating structure on the roller transport unit, particularly on the bottom side thereof, is provided at a second of the longitudinal ends of the locking bar, wherein the locking bar comprises a releasable fixing mechanism for limiting the length of the locking bar set to a selected dimension, to said selected dimension. Advantageous further developments of such a system are that the fixing mechanism of the locking bar may be adapted to fix the length of the locking bar to the set dimension. The at least one rolling transport unit may be a rolling platform with a support platform forming the set-up surface and rolling means arranged on the bottom side. The rolling platform may be free of superstructures arranged on the upper side of the support platform forming the set-up surface, which structures may have a higher overall height than a height of a receiving container. The system may include a plurality of identically formed roller transport units. At least part of each roller transport unit may comprises structures in the set-up surface for positive reception of the rolling means of another roller transport unit set up on the set-up surface. The receiving containers may be configured as boxes, particularly formed in the shape of a cuboid. The receiving containers may each have side walls which can be pivoted relative to their base and can be swung over onto the base substantially parallel thereto, and in that the side walls in a swung-over state have receiving structures corresponding to the stacking structures on a side facing away from the base, for positively locked stacking of another receiving container. The system may include a plurality of similarly formed locking bars.

In another aspect, the invention discloses a locking bar having the features of being adjustable in its length, particularly telescopically, and comprising two opposite longitudinal ends, particularly for use in a system as described above. A first retaining structure is provided at a first of the longitudinal ends of the locking bar and in that a second retaining structure is provided at a second of the longitudinal ends of the locking bar, and in the locking bar has a releasable fixing mechanism for limiting the length of the locking bar set to a selected dimension, to said selected dimension. Advantageous further developments of this aspect are that the locking bar is formed of two bar elements inserted into each other, which are displaceable relative to each other for an adjustment of the length. The locking bar may be of a rectangular or square cross-section. The retaining structures may be formed as hook structures. The releasable fixing mechanism may be adapted to allow stepless length adjustment of the locking bar. The locking bar may be formed from a metallic material.

In accordance with the invention, an improved system for transporting, transferring, and/or storing merchandise, particularly general cargo goods at wholesale and retail stores, includes the following components:

Receiving containers for holding goods during transport and/or storage, each having a base, a peripheral side wall, and an upper opening, and are formed to be stackable. To achieve such stackability, the receiving containers each have stacking structures in the area of their base and mating structures in an area of one of the upper edges of the side wall having the upper opening. The stacking structures and mating structures interact in such a manner as to allow positive locking stacking of receiving containers within one plane of the base.

At least one roller transport unit having a set-up surface for at least one receiving container and roller means arranged on a bottom side opposite the set-up surface, for example rollers or wheels, which can be fixed or steerable. The set-up surface of the at least one roller transport unit has receiving structures corresponding to the stacking structures for the positively locking installation of a receiving container within a plane of the set-up surface.

As an innovation essential to the invention: At least one locking bar which has two longitudinal ends and is length-adjustable, particularly telescopically length-adjustable, and connecting the longitudinal ends. A first retaining structure is provided for connection to an upper edge of a receiving container on a first of the longitudinal ends of the locking bar, and a second retaining structure is provided for connection to a mating structure of the roller transport unit, particularly one arranged on the bottom side, on a second of the longitudinal ends of the locking bar. The locking bar further comprises a releasable fixing mechanism for limiting the length of the locking bar, set to a selected dimension, to said selected dimension.

The special feature of this system is the approach of continuing to fasten a stack of receiving containers, already positively locked by the respective stack structures and receiving structures in the various connecting levels running parallel to the set-up surface, in a positive lock by means of the locking bar. For this purpose, the locking bar is first connected by means of the retaining structure provided at a first of the longitudinal ends to the upper edge of an uppermost receiving container located in the stack, second, the retaining structure at the second of the longitudinal ends of the locking bar is connected to the mating structure on the roller transport unit, and then third, the length of the locking bar is shortened until the locking bar with the respective retaining structures at its longitudinal ends is positively connected to the upper edge of the uppermost receiving container of the stack of receiving containers on the one hand and to the mating structure on the roller transport unit on the other hand, and maintains these connections due to the reduced length. The locking bar thus grips the entire stack of receiving containers, starting from the roller transport unit and extending to the uppermost receiving container in the stack, like a kind of clamp, thus preventing individual receiving containers from being lifted off and detached from the stack. For this purpose, it is advantageous to use at least two locking bars, which are guided, for example, along the opposite longitudinal edges of a roller transport unit with a rectangular set-up surface or, accordingly, along the opposite longitudinal edges of receiving containers provided with rectangular bases and thus fasten the stack of receiving containers on two opposite sides and secure it to the roller transport unit.

The cross-sectional dimensions of the locking bars can be comparatively narrow, such that they require hardly any additional space if two or more packages are arranged next to each other, each with a roller transport unit and a receiving container stacked on top of it, especially if care is taken to ensure that the locking bars are arranged at an offset from each other such that the distance between two loaded roller transport units secured with the locking bars is just once a width or depth of the cross-section of the locking bar.

With such a conception, the accordingly formed packages, i.e., the stacks of storage containers placed on the roller transport units and secured with the locking bars, can be accommodated, for example, on the loading area of a truck in a significantly more compact arrangement compared to the arrangement of trolleys described above. In exemplary calculations, the inventor has determined that an increase in transport capacity, i.e., space utilization, of approx. 15% can be achieved on the loading area of a typical truck with a permissible total weight of 7.5 t compared to a loading with transport containers placed on conventional trolleys.

However, this space saving is of particular advantage not only with respect to the transport of the packages, but also with respect to their storage, for example in a storage area of a retail store. Furthermore, the rolling transport units of the system according to the invention do not have the retaining grids in comparison with the known trolleys, such that the rolling transport units are in themselves comparatively flat units which can be parked and arranged for intermediate storage until return transport in the logistics system or also during such return transport, requiring significantly less space. The locking bars also take up only a small amount of space for their storage and transport, such that they also make a significant contribution to the low space requirement or high space utilization of the system according to the invention.

The mating structure, which characterizes the roller transport unit integrated in the system according to the invention and on which the retaining structure engages at the second longitudinal end of the locking bar, can for example be a simple strip arranged on the bottom side close to the edge, behind which a retaining structure, for example a hook-shaped structure, can engage at the second longitudinal end of the locking bar and be secured there, particularly hooked in. Such a strip may be continuous, but it may also merely cover a section of the length of the side edge in the area of which it is located. Other mating structures are also conceivable, for example holes into which respective pins or the like forming the retaining structure at the second longitudinal end of the locking bar, or other suitable structures, can be inserted and thus secured. Here, other possible structures will readily come to the mind of a person skilled in the art, although the inventor currently prefers a strip-shaped mating structure, since this is easy to form and, in cooperation with the retaining structure at the second longitudinal end of the locking bar, allows a simple form fit to be produced.

The packaging unit (a container unit) of the stack of receiving containers on the roller transport unit, formed with the help of the locking bar or possibly multiple locking bars, can now easily be handled by using the locking bar(s) as handle(s) for moving the roller transport unit along a base. Overcoming obstacles, for example curbs, is also easy with this system. This is because the roller transport unit can be tilted with the stack fixed therein, for example, by pulling on the locking bar(s) accordingly, without the stack of receiving containers coming loose and falling over. For example, wheels or rollers of the roller transport unit can be lifted by tilting accordingly and set down at a higher level, a second unit of the wheels can then be lifted afterwards, to overcome a curb, for example.

In principle, it is sufficient if the fixing mechanism of the locking bar is set up in such a manner that it only prevents an increase in length of the locking bar after it has been adjusted and fastened, but would in principle allow a further reduction in length. Such a mechanism can be implemented, for example, by a ratchet mechanism. The only important thing is that the length of the locking bar cannot be extended once the maximum permissible length has been set, such that the retaining structures can no longer be detached from the mating structures and the positive fit created by the length and the interaction of the retaining structures at the two longitudinal ends of the locking bar with the top edge of the uppermost receiving container in the stack of receiving containers placed on the set-up surface, or with the mating structure on the roller transport unit, is maintained transverse to the plane of the set-up surface and transverse to the plane of the bottoms of the receiving containers. However, it is just as possible that the fixing mechanism of the locking bar is set up to fix the length of the locking bar to the set dimension, such that the length can not only be expanded any further, but also not shortened any further. This can be done, for example, in a telescopic rod with an eccentric lever and a thrust piece in a friction-locked manner, or in other ways known per se. As mentioned, it is sufficient in principle for the establishment of the positive connection relevant for the implementation of the invention if the locking bar can no longer extend the set and fixed length. It is not necessary to apply a tensile force to further fasten the stack. Nevertheless, the locking bar can also have an elastic tensioning means, e.g. a spring, which, starting from a set length, applies a tensile force tending to further shorten the length of the locking bar. Such a tensile force can further secure the tight fit obtained, if necessary, as may be the case, for example, with particularly high stacks of receiving containers and/or particularly heavy goods arranged in the receiving containers.

According to an advantageous further development of the invention, the roller transport unit can particularly be a rolling platform with a support platform forming the set-up surface and roller means arranged on the bottom side. The rolling means can particularly be rollers or wheels, wherein particularly at least a part of the rolling means is designed to be steerable. The rolling platform is advantageously free of superstructures arranged on the upper side of the support platform forming the set-up surface, which structures have a higher overall height than a height of a receiving container. Particularly the receiving structures, which are provided corresponding to the stacking structures at the bases of the receiving containers, may have a specific overall height. These can be, for example, strip-like attachments which fit into corresponding recesses on the receiving container bases and engage there with a positive fit. In contrast, the rolling platform does not require any other superstructures or superstructures extending beyond this, such that it has a limited overall height and is thus designed for compact storage.

As also mentioned above, the system according to the invention can particularly also comprise several identically formed roller transport units, each of which can be loaded with stacks of receiving containers. Advantageously, the system may further comprise a plurality of locking bars.

If the system has several transport units, at least some, particularly all, of the roller transport units can have structures in the set-up surface for form-fitting reception of the rolling means of another roller transport unit installed on the set-up surface. Such a configuration helps for the stacking of roller transport units. The advantage here is that a stack of roller transport units stacked on top of each other (irrespective of whether or not they also have the structures for positively holding the roller means) can again be positively fixed by attaching at least one, preferably at least two, locking bar(s). In such a stack, a locking bar can be connected with the retaining structure at its first longitudinal end to the receiving structures of a transport unit arranged at the top of the stack, and with the retaining structure at the second longitudinal end to the mating structure at the lowest roller transport unit in the stack. In this way, empty roller transport units that can be led back in the logistics chain can be assembled into stacks, and these stacks can be fixed and secured with the locking bars. The result thus is not only a compact transport or storage option that makes optimum use of the transport or storage area. The stacks formed in this way are also secured by the locking bars and cannot fall apart.

The receiving containers of the system according to the invention can particularly be boxes, preferably formed in the shape of a cuboid. Such boxes are widely used, especially in food logistics, but also in logistics for other goods. For example, vegetables and fruits, but also dairy products and other foodstuffs or even non-food items, such as books, are stored and transported arranged in such boxes. The boxes already known and used in logistics are already designed to be stackable in themselves, and can therefore be integrated into a system according to the invention without the need for any modifications. This is also a great advantage of the system according to the invention, because it builds on the existing receiving containers in logistics and can easily integrate them.

Another advantage of the system according to the invention results if the receiving containers each have side walls which can be pivoted relative to their base and can be swung over onto the base substantially parallel thereto, and the side walls in a swung-over state have receiving structures corresponding to the stacking structures on a side facing away from the base, or form them for positively locked stacking of another receiving container. Such a design of foldable or collapsible receiving containers is, for example, already known on the market in the form of collapsible boxes as receiving containers in the logistics system. These already known folding boxes can also be stacked on top of each other in the folded state, in that the folded boxes form on their upper side a mating structure corresponding to the stacking structures on the bottom side of the base, in which the stacking structures of the base of a set-up folding box can engage and lock therein positively in a direction transverse to the plane of the box base. Such an arrangement of the system with respective receiving containers results in the advantage that the receiving containers can be temporarily stored once again in a more space-saving manner, that they can also be transported after use in a space-saving manner for a return transport for reuse in the logistics system. In addition, there is also the advantage here that the emptied and folded receiving containers can also be fastened with the locking bar of the system according to the invention in a stack, stacked on a roller transport unit, and can be fixed and secured in this manner, such that compact units can be formed which comprise several folded receiving containers. Particularly, if the roller transport units also have a stackable design, units can be assembled very freely and fixed in stacks with the locking bars from stackable roller transport units, stackable receiving containers and stackable, foldable (collapsed) receiving containers for return, but also for intermediate storage on site in a warehouse of the recipient of the goods delivered with the system according to the invention. Particularly, in the system according to the invention, there is also the freedom to form stacks mixed from various of the elements of the system, e.g. from multiple roller transport units, multiple rigid boxes and multiple folding boxes, wherein such a mixed stack can also be positively secured by means of one or more locking bars in the manner described above.

If the system has multiple roller transport units, it may also be possible to connect two or more of the roller transport units to one another, e.g. by means of clamp elements which can be inserted, for example, in opposing receiving openings in the roller transport units. In this way, units consisting of two or more roller transport units packed, for example, with stacked receiving containers, can then be moved as a joint packaging unit.

Another aspect of the invention, as mentioned above, is a locking bar adjustable in length, particularly telescopically, and having two opposite longitudinal ends, which can be utilized particularly for use in a system as described above. This locking bar is characterized in that a first retaining structure is provided at a first of the longitudinal ends of the locking bar and that a second retaining structure is provided at a second of the longitudinal ends of the locking bar, and in that the locking bar has a releasable fixing mechanism for limiting the length of the locking bar set to a selected dimension, to said selected dimension. This locking bar, as can be easily recognized, can be used in its function in a manner as described above in a system set forth above, and in this respect, particularly in interaction with the mating structure on the bottom side of the roller transport unit, represents an essential aspect, indeed the heart, of this idea.

The locking bar according to the invention can particularly be formed from two bar elements inserted into each other, which can be displaced relative to each other for adjusting the length. Of course, other designs are also conceivable, for example locking bars with three or more bar elements, which allow more compact telescoping. However, a higher number of bar elements increases the complexity of the locking bar structure and reduces its stability, so two bar elements are preferred. Two bar elements can also be used to achieve sufficient spans of length variation. A typical locking bar for use in a system described above may have a maximum length from, for example, about 2 m to about 2.5 m and, if made from two bar elements, may be shortened accordingly to about 1.1 m to about 1.4 m.

Preferably, a locking bar according to the invention has a rectangular or square cross-section. On the one hand, such an arrangement is favorable with respect to an orientation of the retaining structures, since, for example, two bar elements cannot twist relative to each other. Furthermore, rectangular or square cross-sections help align the locking bar relative to an outer edge of a stack of receiving containers or the set-up surface of the roller transport unit.

In principle, the retaining structures can be formed in any way, adapted to the respective structures to be positively gripped, to which the retaining structures are to be secured.

Preferably, the retaining structures are formed as hook structures, since such hook structures can be easily implemented and enable reliable form-fitting retention.

The releasable fixing mechanism of the locking bar according to the invention can, particularly, allow the length of the locking bar to be adjusted continuously, such that this length can be set according to completely differently formed stacks which are to be locked positively.

The locking bar according to the invention can particularly and advantageously be formed from a metallic material, for example steel or aluminum. This choice of material makes the locking bar sufficiently stable and inherently rigid to perform the holding and locking function in a system according to the invention as described above.

BRIEF DESCRIPTION OF THE SEVERAL VIEWS OF THE DRAWINGS

Further advantages and features result from the following description of an exemplary embodiment on the basis of the attached figures, wherein:

FIG. 6 shows a stack of storage containers formed by means of a system according to the invention for transporting, transferring, and/or storing goods, secured by the locking bars and placed on a rolling transport unit;

FIG. 7 shows a stack of roller transport units placed one on top of the other and secured by means of locking bars according to the invention;

DETAILED DESCRIPTION

The figures show highly schematic views of embodiments of individual elements of a system according to the invention for transporting, transferring, and/or storing goods, particularly general cargo goods in the wholesale and retail trade. The figures shown are limited to purely schematic representations and are neither to scale nor true to detail. In this respect, they do not serve as design models but merely to explain the principle of the invention disclosed and claimed here.

Figure 1:
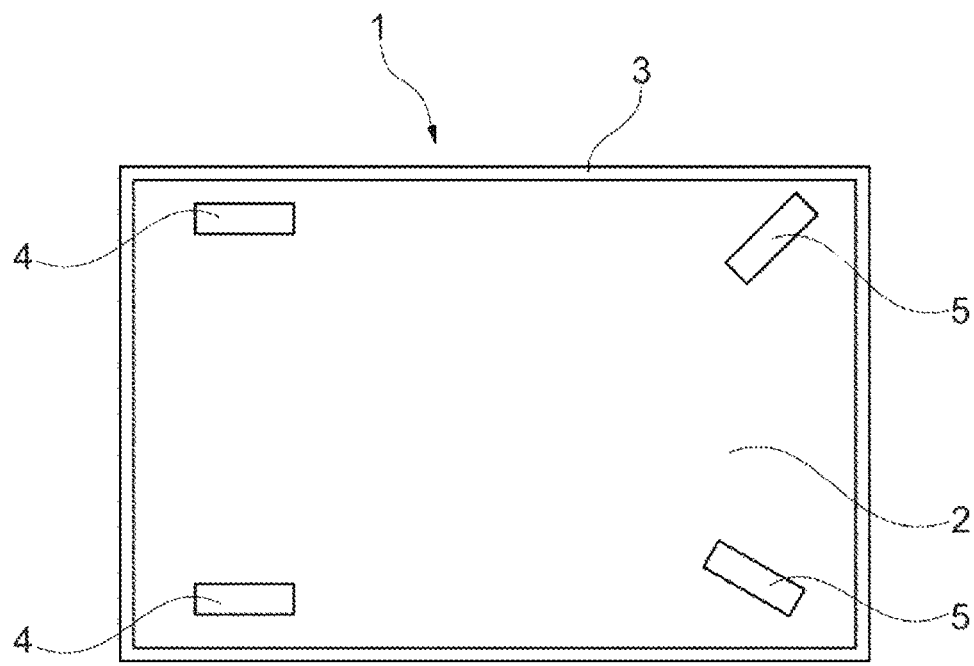
FIG. 1 shows a schematic top view of the set-up surface of a roller transport unit of a system according to the invention for transporting, transferring, and/or storing goods.

FIG. 1 initially shows a top view of a roller transport unit 1, namely with a view to a set-up surface 2. First of all, a strip 3 can be seen running around the edge of the set-up surface 2 and projecting beyond the plane of the set-up surface 2 (see also FIG. 2). Furthermore, it can be seen that recesses 4 and 5 have been made in the set-up surface 2.

Figure 2:
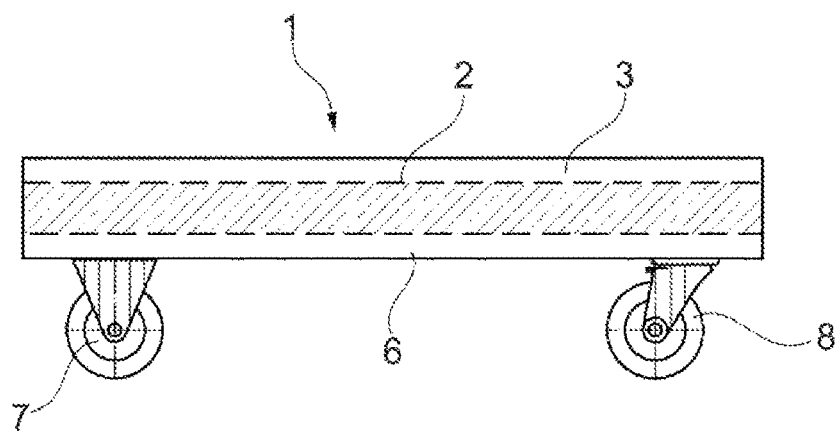
FIG. 2 shows a side view of the roller transport unit of a system according to the invention for transporting, transferring, and/or storing goods.

FIG. 2 shows a side view of the roller transport unit 1 and indicates that, in addition to the circumferential strip 3 projecting over the set-up surface 2, a strip 6 formed close to the edge is also provided on an opposite bottom side. Wheels 7 and 8 arranged on the bottom side are visible as well. In the example shown here, the wheels 7 are rigidly arranged, while the wheels 8 are steerable.

The circumferential strip 3, which defines the top of the set-up surface 2, serves as a form-fitting stack fastening for a correspondingly shaped bottom side of a receiving container (see also below) placed on the set-up surface 2 and the wheels 7, 8 of a second roller transport unit 1 can be inserted in the recesses 4, 5 in the set-up surface 2 of a first roller transport unit 1 and thereby positively fixed against movements within the plane of the set-up surface 2, in order to stack two roller transport units 1.

Figure 5:
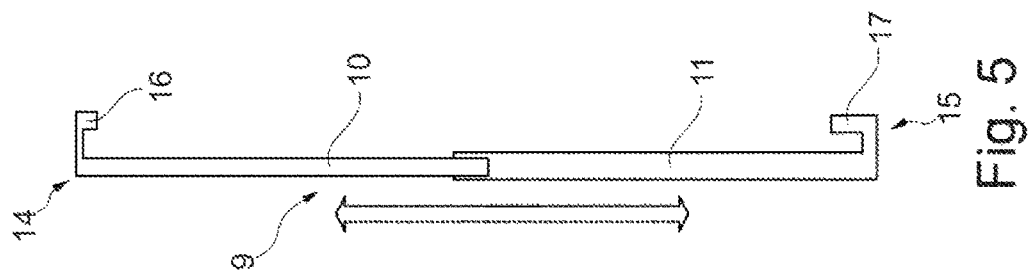
FIG. 5 shows a side view of the inventive locking bar of FIG. 3 at maximum length.
Figure 4:
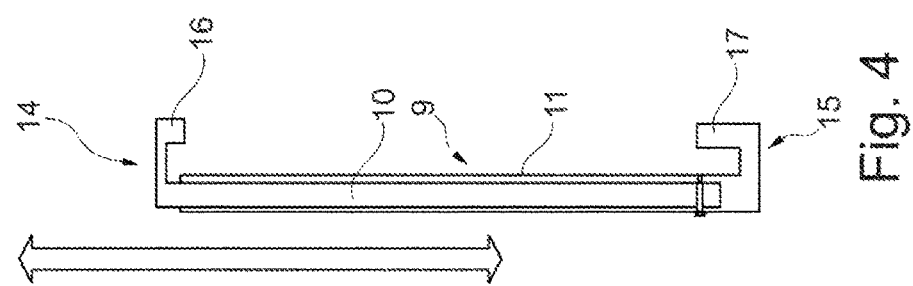
FIG. 4 shows a side view of the inventive locking bar of FIG. 3 in a maximum telescoped position.
Figure 3:
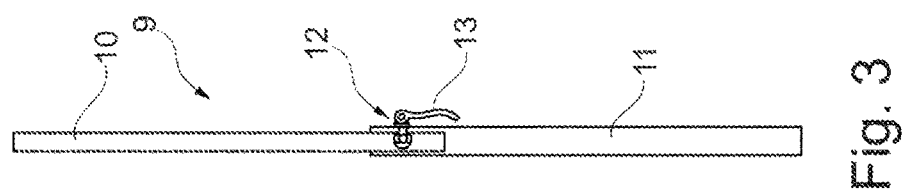
FIG. 3 shows a rear view of a locking bar according to the invention.

FIGS. 3 to 5 schematically show a locking bar 9 of a system for transporting, transferring, and/or storing goods according to the invention. This locking bar 9 consists of two bar elements, a first bar element 10 and a second bar element 11 which is inserted into the first bar element 10 and can be displaced relative to the first bar element 10 by being inserted into it or pulled out of it. In this way, the length of the locking bar 9 can be changed telescopically. A fixing mechanism 12 operated by a lever 13 allows fixing the length of the locking bar 9, which can be steplessly adjusted in this way, after it has been set to a desired dimension.

FIGS. 4 and 5 show lateral views of the locking bar 9. It can be seen here that retaining structures 16 and 17 in the form of retaining hooks are formed at opposite longitudinal ends, a first longitudinal end 14, and a second longitudinal end 15. FIGS. 4 and 5 illustrate once again the option of adjusting the length of the locking bar 9 by telescoping the two bar elements 10 and 11 relative to each other.

FIG. 6 shows a schematic view of a stack of containers formed with receiving containers 18 in the form of stacking boxes on a roller transport unit 1. The receiving containers 18 in the form of the stacking boxes each have a circumferential side wall 19 as well as a base 20 and form a stacking structure 21 in the region of their base 20, which interacts with a mating structure 22, in this case the upper edge of the side wall 19, in order to prevent a form fit with respect to relative movements parallel to the plane of the base 20 in a stacked state. In this case, the stacking structures 21 are also formed in such a manner that they likewise interact positively with the circumferential strip 3, which defines the set-up surface 2 of the roller transport unit 1. It can also be seen here how the stack of receiving containers 18 thus formed on the roller transport unit 1 is positively secured in a direction transverse to the planes of the bottoms 20 by means of two locking bars 6, in that the locking bars 9 with their hook-shaped retaining elements 16, 17 grip around the mating structures in the form of the upper edges of the side walls 19 of the uppermost transport container 18 in the stack, or the mating structures in the form of the bottom side strip 6 on the roller transport unit 1, wherein the locking bars 9 are shortened and adjusted in their length in such a manner that the positive connection remains, i.e., that the locking bars 9 secure the stack of receiving container containers in themselves and at the same time retain them on the roller transport unit 1.

FIG. 7 shows another example of how, for example, a stack of roller transport units 1 placed on top of each other can likewise be fixed and secured with the locking bars 9. Here, too, the locking bars 9 with their retaining structures 16, 17 engage around corresponding mating structures, on the one hand the circumferential bar 3 of the uppermost of the stacked roller transport units 1 and on the other hand the bottom side bar 6 of the lowermost roller transport unit 1 carrying the stack.

Figure 8:
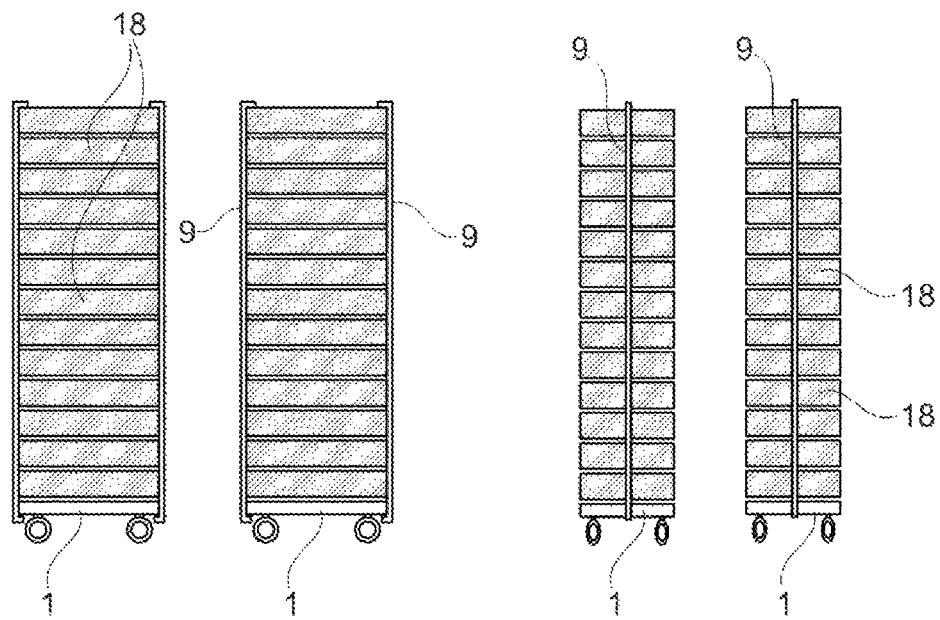
FIG. 8 shows a side view (left) and a rear view (right) of two stacks of storage containers formed by means of a system according to the invention for transporting, transferring, and/or storing goods and secured by the locking bars, each stack being placed on a roller transport unit.

In this way, for example, a stack of roller transport units 1 not currently required for the storage or transport of goods can be formed and either stowed in a warehouse in a space-saving manner or placed in a return transport in a space-saving manner. FIG. 8 shows once again for illustration purposes how two stacks of transport containers 18 are each stacked on a roller transport unit 1 and positively secured with locking bars 9, wherein FIG. 8 shows in each case a side view of the two stacks and next to it a front view of the two stacks now placed next to each other in this view.

Figure 9:
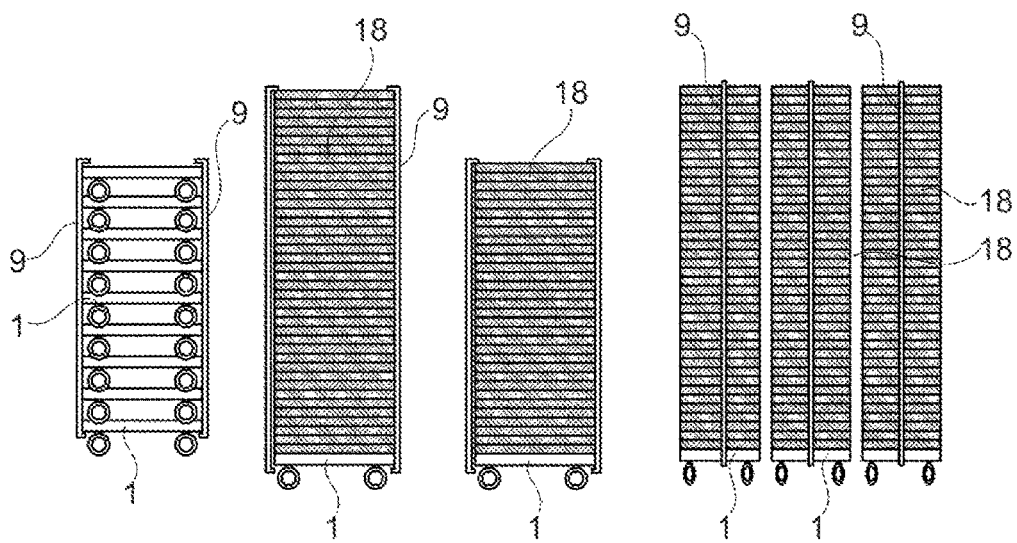
FIG. 9 shows different variations of stacks of elements of the system according to the invention for transporting, transferring, and/or storing goods, each set up on a roller transport unit.

Finally, FIG. 9 shows once again a variety of possible combinations of components of the system according to the invention stacked on a roller transport unit 1 and secured with the locking bars 9, namely on the left a stack of roller transport units 1, again secured with the locking bars 9, and then in five different views and with partially different stack heights, stacks of receiving containers 18, which here are those with fold-down side walls, particularly folding boxes, which are also secured with the locking bars 9 and positively locked into one another. It should be noted that the collapsed receiving containers 18, in a manner already known per se for transport boxes of this type, also form mating structures on an upper side in the collapsed state for receiving the stacking structures 21 on the bottom side of the subsequently stacked receiving container 18. The locking bars 9 engage these structures with their upper retaining structures 16. This representation in FIG. 9 illustrates once again the flexibility with which space-saving stacks can be formed from the various elements of the system according to the invention when they are not in use for the storage or transport of goods, i.e. how this considerably reduces the space required for intermediate storage and/or return transport, while at the same time considerably facilitating the handling of these stacks, since these stacks, just like the stacks shown in FIG. 8 with the receiving containers 18 filled with goods, for example, can also be moved by gripping the locking bars 9 on the roller transport unit 1 arranged at the bottom.

List of Reference Numerals 1 roller transport unit
2 set-up surface
3 strip
4 recess
5 recess
6 strip
7 wheel
8 wheel
9 locking bar
10 bar element
11 bar element
12 fixing mechanism
13 lever
14 longitudinal end
15 longitudinal end
16 retaining structure
17 retaining structure
18 receptacle
19 side wall
20 base
21 stacking structure
22 mating structure

The invention claimed is:

1. A system for transporting, transferring, or storing goods, particularly general cargo goods in the wholesale and retail trade, wherein the system comprises:
   stackable receiving containers, each having:
      a base;
      a peripheral side wall; and
      an upper opening for receiving goods during transport or during storage;
   stacking structures in a region of the base;
   first mating structures formed in a region of an upper edge of the peripheral side wall facing the upper opening, wherein the stacking structures are configured to interact with the first mating structures of another receiving container thereby enabling the stackable receiving containers to be stacked one on top of the other in a positively locking manner within a plane of the base;
   at least one roller transport unit having:
      a set-up surface for at least one receiving container;
      a bottom side opposite the set-up surface;
      roller means;
      wherein the set-up surface includes receiving structures corresponding to the stacking structures for setting up the receiving containers in a positively locking manner within a plane of the set-up surface; and
   at least one locking bar having a first longitudinal end and a second longitudinal end and being adjustable in length;
   a first hook structure provided at the first longitudinal end for detachably hooking onto the upper edge of an uppermost receiving container of a stack of the stackable receiving containers;
   a second hook structure provided at the second longitudinal end for detachably hooking onto a second mating structure on the at least one roller transport unit;
   a releasable fixing mechanism provided on the at least one locking bar intermediate the first hook structure and the second hook structure; said releasable fixing mechanism being operable for limiting the length of the at least one locking bar, said releasable fixing mechanism being settable to a selected dimension to limit the length of the at least one locking bar to said selected dimension; and
   wherein the at least one locking bar clampingly retains the stack of stacked receiving containers in engagement with the at least one roller transport unit such that the upper edge of the uppermost receiving container is maintained transverse to a plane of the set-up surface of the at least one roller transport unit during transport and during storage.

2. The system according to claim 1, wherein the at least one roller transport unit is a rolling platform with a support platform forming the set-up surface and the roller means are arranged on the bottom side.

3. The system according to claim 2, wherein the rolling platform is free of superstructures arranged on an upper side of the support platform forming the set-up surface which have a higher overall height than a height of a receiving container.

4. The system according to claim 1, wherein the at least one roller transport unit comprises a plurality of identically formed roller transport units.

5. The system according to claim 4, wherein at least a part of the at least one roller transport unit comprises structures in the set-up surface for positive reception of the roller means of another roller transport unit of the at least one roller transport unit set up on the set-up surface.

6. The system according to claim 1, wherein the stackable receiving containers are configured as boxes.

7. The system according to claim 1, wherein the receiving containers each have side walls which are pivotable relative to their base and are able to be swung-over onto the base substantially parallel thereto, and wherein the side walls, on a side facing away from the base in a swung-over state, have receiving structures corresponding to the stacking structures for positively locked stacking of another receiving container.

8. The system according to claim 1, wherein the at least one locking bar comprises a plurality of similarly formed locking bars.

9. The system according to claim 1, wherein the at least one locking bar is formed of two bar elements, wherein one of the two bar elements is inserted into the other of the two bar elements; and wherein the two bar elements are displaceable relative to each other to adjust the length of the locking bar.

10. The system according to claim 1, wherein the at least one locking bar has a rectangular cross-section or a square cross-section.

11. The system according to claim 1, wherein the at least one locking bar is formed from a metallic material.

12. The system according to claim 1, wherein the at least one locking bar adjusts in length by telescoping.

13. The system according to claim 6, wherein the boxes are formed in the shape of a cuboid.

14. The system according to claim 1, wherein the at least one locking bar is releasably attachable to the at least one roller transport unit.

15. The system according to claim 1, wherein the at least one locking bar is adjustable to a first length to enable engagement of the first hook structure with the uppermost receiving container and the second hook structure with the at least one roller transport unit; and wherein the at least one locking bar is adjustable to a smaller second length to clamp the stack of stackable receiving containers to the at least one roller transport unit.

16. The system according to claim 1, wherein the at least one locking bar comprises:

a first bar element and a second bar element which are rectangular or square in cross section;

wherein the first longitudinal end of the at least one locking bar is provided on the first bar element and the second longitudinal end of the at least one locking bar is provided on the second bar element; and wherein the first bar element and second bar element are telescopingly engaged with one another and are movable relative to one another to adjust a distance between the first hook structure and the second hook structure.

17. The system according to claim 1, wherein the at least one locking bar is always oriented transverse to the plane of the set-up surface of the at least one roller transport unit.

* * * * *